US008372228B2

(12) United States Patent
Citterio

(10) Patent No.: US 8,372,228 B2
(45) Date of Patent: Feb. 12, 2013

(54) METHOD AND APPARATUS FOR CONTINUOUS PRODUCTION OF A TEXTILE STRUCTURE RESISTANT TO PERFORATION AND PENETRATION AND TEXTILE STRUCTURE THUS OBTAINED

(75) Inventor: Giorgio Celeste Citterio, Monza (IT)

(73) Assignee: Societa' per Azioni Fratelli Citterio, Monza (IT)

( * ) Notice: Subject to any disclaimer, the term of this patent is extended or adjusted under 35 U.S.C. 154(b) by 208 days.

(21) Appl. No.: 12/794,125

(22) Filed: Jun. 4, 2010

(65) Prior Publication Data
US 2010/0307664 A1    Dec. 9, 2010

(30) Foreign Application Priority Data
Jun. 8, 2009    (IT) .............................. MI2009A0991

(51) Int. Cl.
B32B 37/00    (2006.01)
B29C 65/00    (2006.01)
(52) U.S. Cl. .............................. 156/148; 156/393; 2/2.5
(58) Field of Classification Search .................. 156/166, 156/176, 178, 179, 184, 148, 393; 2/2.5
See application file for complete search history.

(56) References Cited

U.S. PATENT DOCUMENTS

| | | | |
|---|---|---|---|
| 5,124,195 A * | 6/1992 | Harpell et al. ................. | 428/152 |
| 5,259,645 A | 11/1993 | Hirabayashi et al. | |
| 5,354,605 A | 10/1994 | Lin et al. | |
| 5,789,327 A * | 8/1998 | Rousseau ....................... | 442/135 |
| 6,846,758 B2 | 1/2005 | Bhatnagar et al. | |
| 7,148,162 B2 | 12/2006 | Park et al. | |
| 2002/0164911 A1 * | 11/2002 | Cunningham et al. ........ | 442/135 |
| 2004/0045428 A1 * | 3/2004 | Citerrio ........................ | 89/36.05 |

FOREIGN PATENT DOCUMENTS

| | | |
|---|---|---|
| AU | 62305/73 | 5/1975 |
| EP | 0 805 332 A2 | 11/1997 |
| EP | 0 805 332 A3 | 11/1997 |
| EP | 0 683 374 B1 | 7/1999 |
| EP | 1 241 432 B1 | 8/2006 |
| WO | WO 02/090866 A1 | 11/2002 |
| WO | WO 2005/028724 A2 | 3/2005 |
| WO | WO 2005/028724 A3 | 3/2005 |

* cited by examiner

*Primary Examiner* — Khanh P Nguyen
*Assistant Examiner* — Carson Gross
(74) *Attorney, Agent, or Firm* — Oblon, Spivak, McClelland, Maier & Neustadt, L.L.P.

(57) ABSTRACT

The present invention refers to a method for continuous production of a textile structure resistant to perforation and penetration, comprising the steps consisting in:
a) simultaneously weaving two fabric elements overlapped and spaced from each other, wherein at least the warp or chain threads of the upper fabric element and the weft threads of the lower fabric element, or vice-versa, comprise ballistic threads;
b) inserting, during said weaving step, at least one intermediate layer between said upper fabric element and said lower fabric element;
c) joining the assembly of the two upper and lower fabric elements interposed between which is said intermediate layer to obtain a multilayer textile structure.

10 Claims, 5 Drawing Sheets

METHOD AND APPARATUS FOR CONTINUOUS PRODUCTION OF A TEXTILE STRUCTURE RESISTANT TO PERFORATION AND PENETRATION AND TEXTILE STRUCTURE THUS OBTAINED

The present invention refers to a method and an apparatus for continuous production of a textile structure resistant to perforation and penetration and to a textile structure resistant to perforation and penetration thus obtained.

By textile structure resistant to perforation and penetration it is meant to indicate a multi-layer structure at least partially made with so-called "ballistic fibers", i.e. with fibers having high strength, tenacity and elastic modulus, like, purely as an example, fibers of polyaramid, polyvinyl alcohol, polyacrylonitrile, polybenzoxazole (PBO), polyolefin, polyamide, glass or carbon.

As known to the man skilled in the art, "ballistic fibers" typically have a modulus of rupture of over 200 g/den, elongation to rupture of over 3%, tenacity of over 8 g/den and impact strength of over 8 J/g.

These kinds of fibers are known to the man skilled in the art, as can be seen, purely as an example, from U.S. Pat. No. 5,354,605.

Such textile structures generally have characteristics of flexibility and are used for example to manufacture bulletproof, explosion-proof or knife-proof personal armor. Moreover, if they are suitably treated, for example by impregnation with a thermoplastic or thermosetting matrix or by coupling with external coating layers, they can take on characteristics of rigidity. In this case, they are used to make helmets, armor or any other rigid item that must offer resistance to perforation and penetration of bullets, fragments, pointed or sharp objects and the like.

Currently there are different types of structures that are resistant to perforation and penetration and different processes for producing them.

In particular, the known types are at least the following:

Structures comprising at least two overlapped layers, each of which, in turn, comprises a bundle of unidirectional ballistic fibers that are parallel to one another. The ballistic fibers of one of such two layers are differently oriented to the ballistic fibers of the other layer; generally, the ballistic fibers of one layer are oriented by an angle comprised between 0° and 90° with respect to the ballistic fibers of the layer overlapping it. The two overlapped layers of ballistic fibers are joined together in various ways. For example this can be by stitching, by interposition between them of a binding layer or by impregnation of the ballistic fibers constituting the two layers with a binding material and subsequent possible application of pressure and/or heat treatment. Structures falling into such a type are described for example in EP 0 683 374 and U.S. Pat. No. 7,148,162, both to Andrew D. Park, and in EP 0 805 332 and US 2004/0045428, both to Citterio.

Structures as described for example in EP 1 241 432, to Teijin Twaron GmbH.

Structures comprising a fabric made of ballistic fibers and having at least one surface that has at least one portion coated with an elastomer on which a plastic film is applied. Structures of this type are described for example in U.S. Pat. No. 6,846,758 B2, to A. Bhatnagar (Honeywell International Inc.).

In greater detail and with particular reference to structures comprising at least two layers of unidirectional or semi-unidirectional ballistic fibers, overlapping one another, the following is noted.

EP 0 683 374 B1 (Andrew D. Park) describes a panel having a structure that comprises a first layer, consisting of a bundle of unidirectional ballistic fibers parallel to one another, and a second layer, also consisting of a bundle of unidirectional ballistic fibers parallel to one another and overlapping the first so that the ballistic fibers of the second layer are arranged at 90° with respect to the ballistic fibers of the first layer. Each of the first and second layer in turn consists of a laminate, which is produced from a bundle of unidirectional ballistic fibers that are fed by a creeled yarn package or by a warp beam. Such ballistic fibers, passing through a thread guide, are deposited parallel to one another on a plane. The layer of ballistic fibers thus obtained passes over a roller that applies a film of thermoplastic material (polyethylene) to one of the two faces thereof. The assembly thus obtained passes through a pre-lamination group and the laminate thus produced is wound around a take-up beam. In order to produce the panel, two laminates are unwound from the relative take-up beam and are overlapped one another so that the ballistic fibers of one are oriented at 90° with respect to the ballistic fibers of the other and their face coated with the film of thermoplastic material (polyethylene) faces outwards. The two laminated layers thus overlapped are then subjected to heat action so as to melt the film of polyethylene that covers and encapsulates the ballistic fibers.

U.S. Pat. No. 7,148,162 B2 describes a laminated panel having a structure comprising two composite layers that overlap one another. Every composite layer comprises a bundle of continuous ballistic fibers arranged parallel to one another on a plane and associated with at least one pre-stabilizing net. The pre-stabilizing net consists of a heat-activated adhesive polymer. The two composite layers are overlapped one another so that the ballistic fibers of a composite layer are oriented at 90° with respect to the ballistic fibers of the other composite layer. The outer faces of the two composite layers overlapping one another are coated with a film of thermoplastic material. The assembly thus obtained is laminated with application of pressure and heat to obtain the laminated panel.

The panels described in EP 0 683 374 B1 and in U.S. Pat. No. 7,148,162 B2 are obtained with discontinuous processes that initially provide the production of the single composite layers or laminates separate from one another and, thereafter, the assembly by overlapping of the single composite layers or laminates, without interposition between them of intermediate layers, and the consolidation of the assembly thus obtained in a multi-layer structure. Such discontinuous processes require that a plurality of separate operations be carried out with consequent long execution times that substantially affect the production costs.

In order to avoid such drawbacks a continuous production method as described in EP 0 805 332 A2 and in US 2004/0045428 has been proposed. Such a continuous method is carried out with "textile machines" of the so-called "multi-axial" type, produced and marketed for example by Liba Maschinenbau GmbH, which allow different flat layers of unidirectional ballistic fibers to be deposited in succession one after the other and one on top of the other to form a continuous band. Each flat layer consists of a bundle of ballistic fibers parallel to one another and the ballistic fibers of one layer are oriented according to an angle comprised between 0° and 90° with respect to the ballistic fibers of the layer beneath it. During the formation of the band, a film of thermoplastic or thermosetting material is inserted between the two overlapped layers of ballistic fibers. The layers of ballistic fibers thus overlapped with the interposition of film made of thermoplastic or thermosetting material are then joined through knit stitching. Such knit stitching is carried out with needles that pass through the thickness of the various overlapped layers binding them with a binding thread. The band thus obtained then passes through a lamination group and is wound in a roll.

Such a method also has a series of drawbacks.

A first drawback consists of the fact that, whilst it is a continuous method, it requires large available spaces and in any case involves substantial production times. Indeed, the formation of every single layer of unidirectional fibers takes place through a respective thread-comb head, for which reason in order to make a multi-layer structure it is necessary to provide different thread-comb heads, one after another along the line of forward movement of the band being formed. Each layer of fibers starting from the second is then deposited on the underlying layer previously formed by a respective thread-comb head.

Another drawback consists of the fact that the fibers of each layer that are deposited by a respective thread-comb can deviate from the straight unidirectionality required, compromising the properties of resistance to penetration and to perforation of the panel thus obtained.

A further drawback consists of the fact that if the ballistic fibers of two successive layers had a relative orientation of 0°/90°, the subsequent knit stitching thereof would not make it possible to obtain a panel with symmetrical structure, which is however necessary for ballistic purposes. In order to obtain such a structure it is forced and limited to deposit the ballistic fibers of two successive layers with a relative orientation of ±45°.

Yet another drawback consists of the fact that the knit stitching of the various overlapped layers limits the choice of film to be interposed between two successive layers of ballistic fibers; such a film, indeed, since it has to be passed through by needles, cannot have high tenacity. Moreover, the penetrating needles can damage the ballistic fibers themselves.

The last but not least drawback of such a known method consists of the fact that the frames of "multi-axial" machines with which it is carried out have a fixed width that cannot be modified. This obviously constitutes a great limitation to application if one considers the fact that the market often requires panels of different widths.

EP 1 241 432 B1, on the other hand, describes a multi-layer structure consisting of two weft and warp woven fabric pieces and wherein the warp threads of one of the two fabric pieces and the weft threads of the other of the two fabric pieces consist of ballistic fibers. The other threads, weft and warp respectively, of the two fabric pieces consist of binding threads. The two fabric pieces are overlapped and joined together for example by stitching, by lamination or by impregnation with resins.

This last method is also discontinuous and foresees the weaving of each of the two fabric pieces on a respective traditional loom for the weft and warp weaving. Each of the two woven fabric pieces is then wound up in a roll. The two fabric pieces are then overlapped and laminated together with the interposition between them of an adhesive film or glue. The assembly thus obtained is then subjected to subsequent finishing treatments.

The weaving of each of the two fabric pieces with a respective traditional loom for the weft and warp weaving requires long execution times and equally high investment and management costs.

These drawbacks in terms of productivity and costs are worsened even further by the subsequent assembly and coupling operations of the woven fabric pieces that are carried out successively and in separate stations.

Another drawback consists of the fact that the single woven fabric pieces have low stability due to the presence of the binding threads woven with the ballistic fibers. The binding threads, indeed, have the purpose of allowing the weaving of the ballistic fibers, and for this reason they are generally thin and have low tenacity thus making the fabric structurally not very stable. This makes it difficult to manipulate the single fabric pieces and to overlap them exactly so as to keep the ballistic fibers correctly oriented.

There are also known textile structures comprising two overlapped layers each of which consists of a bundle of unidirectional and coplanar ballistic fibers, wherein the fibers of one layer are oriented at 90° with respect to the fibers of the other layer and the fibers of the two layers are stabilized by a plain-woven of binding threads interwoven in weft and warp between them. Examples of multi-layer structures of this type are described in WO 02/090866 or in WO 05/028724.

The purpose of the present invention is to propose a method for continuous production of a textile structure resistant to perforation and penetration that allows a multilayer textile structure to be obtained in a short time and with low investment and management costs and, therefore, with greater productivity with respect to known processes.

Another purpose of the present finding is to provide a method for continuous production of a textile structure resistant to perforation and penetration that allows a multilayer textile structure to be obtained that is structurally stable, i.e. in which the ballistic fibers maintain the desired orientation without undergoing deviations or overlapping with respect to one another and without them being damaged.

Yet another purpose of the present finding is to provide a continuous method that allows to obtain textile structures resistant to penetration and perforation the width of which can easily be modified.

Another purpose of the present invention is to propose an apparatus for implementing a method for continuous production of a textile structure resistant to perforation that is particularly simple and functional and has reduced overall dimensions.

These purposes according to the present invention are accomplished with a method for continuous production of a textile structure resistant to perforation and penetration as outlined in claim 1.

These purposes are also obtained with an apparatus for implementing the method for continuous production of a textile structure resistant to perforation and penetration as outlined in claim 10.

Further characteristics are foreseen in the dependent claims.

The characteristics of the present invention will become clearer from the following description, given as an example and not for limiting purposes, referring to the attached drawings in which.

Figure 1:
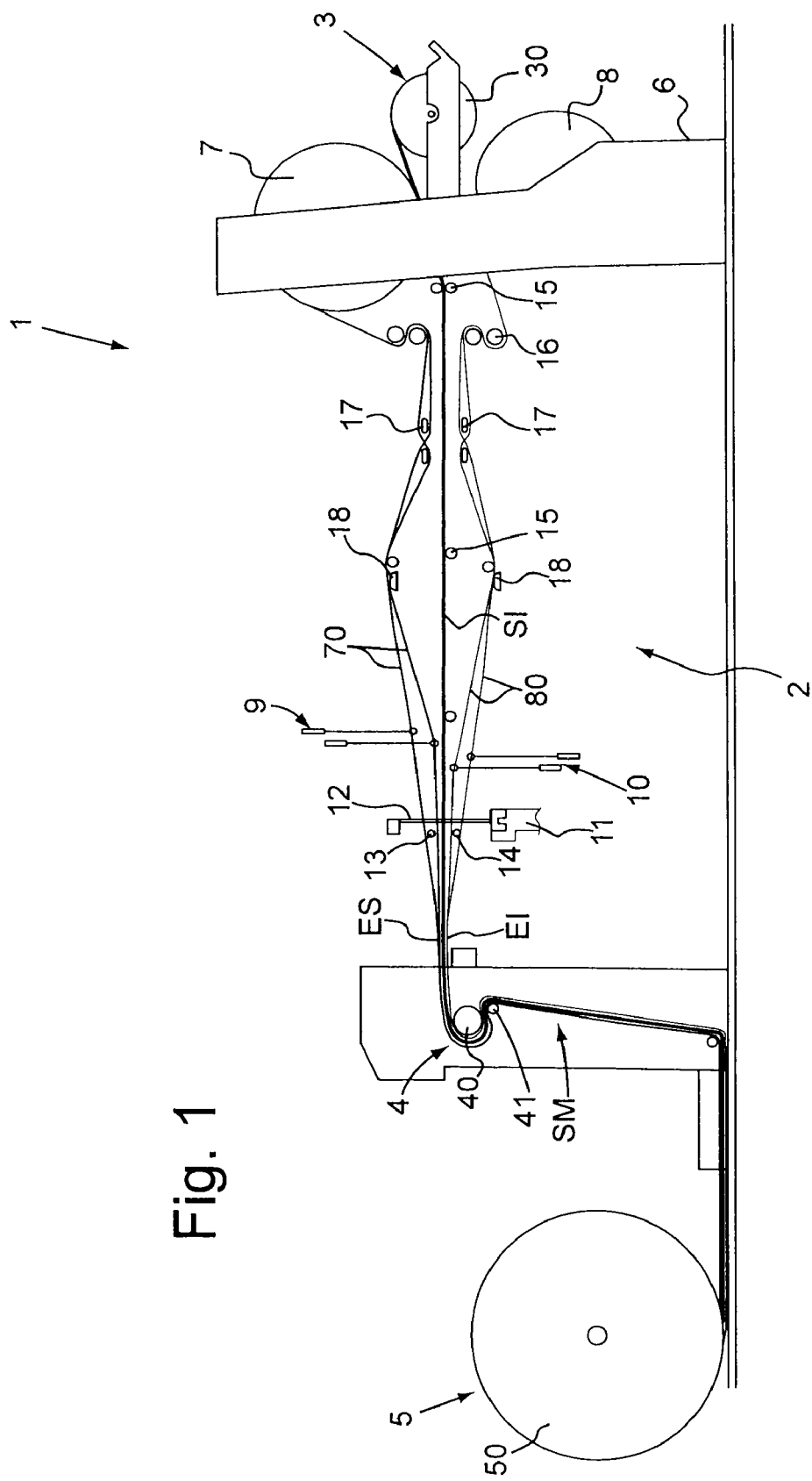
FIG. 1 is a side elevational schematic view of an apparatus for implementing the method for producing a textile structure resistant to perforation and penetration according to the present invention.
Figure 3B:
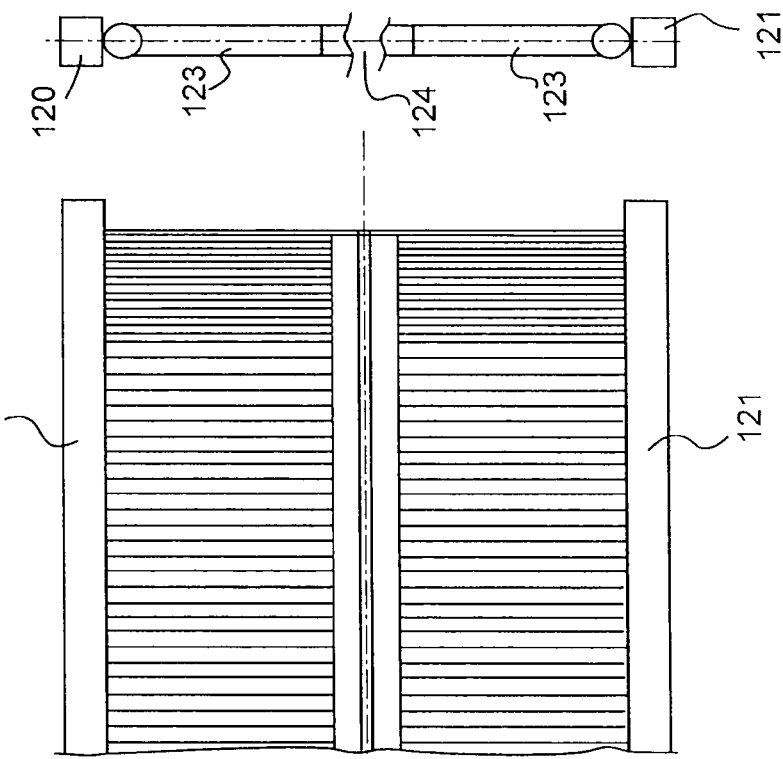
Figure 3A:
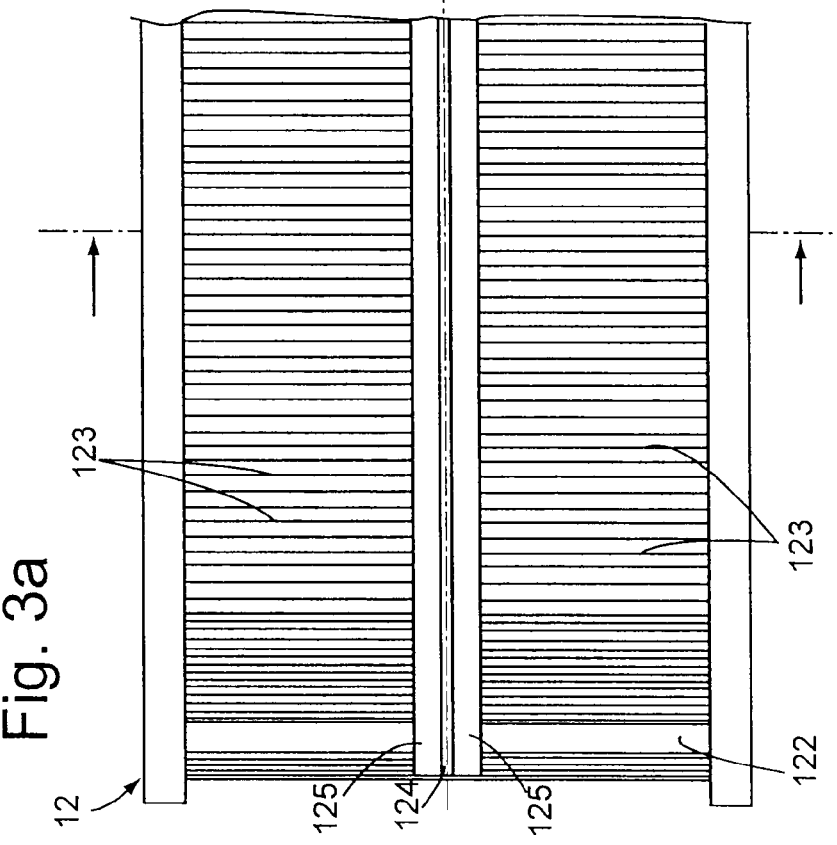
Figure 4:
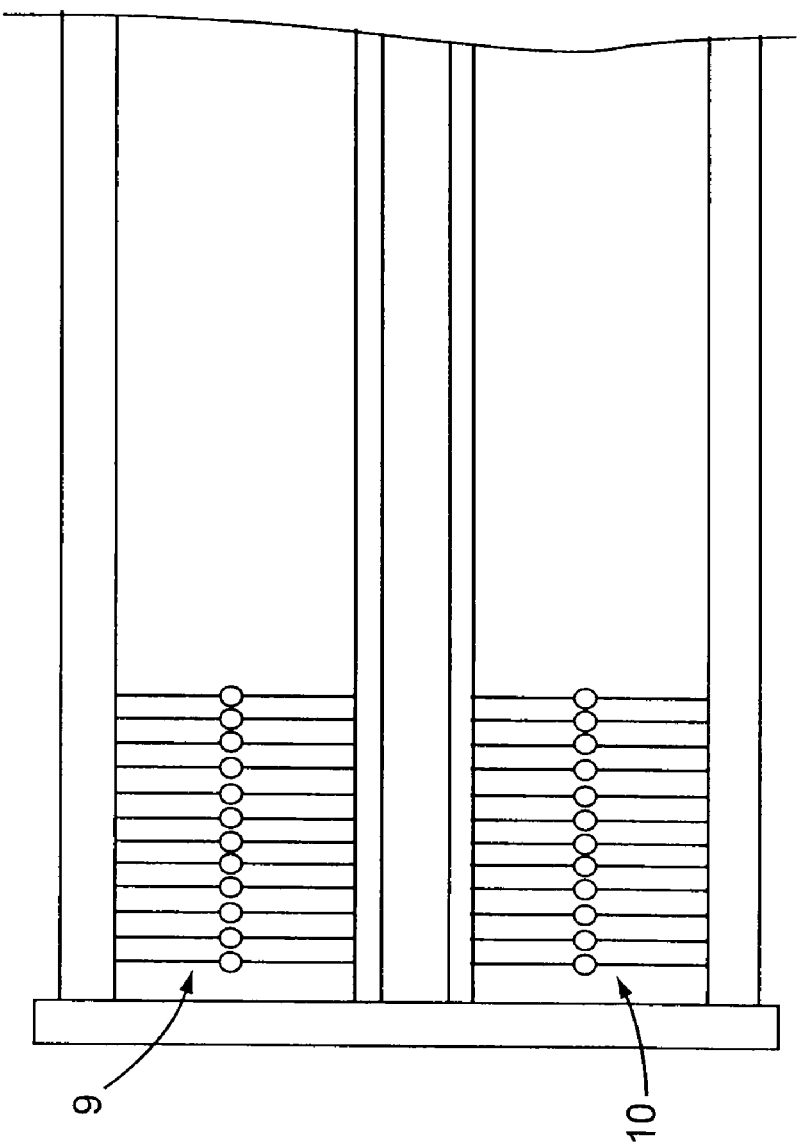
Figure 5:
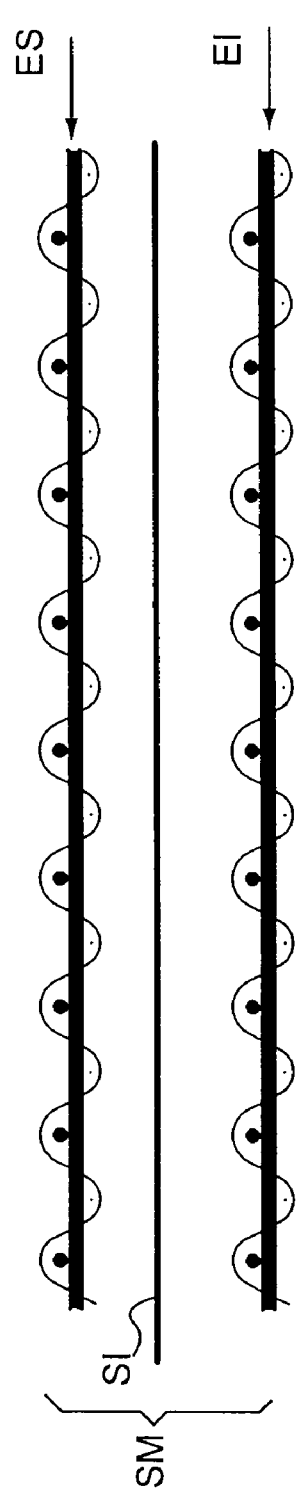
Figure 6:
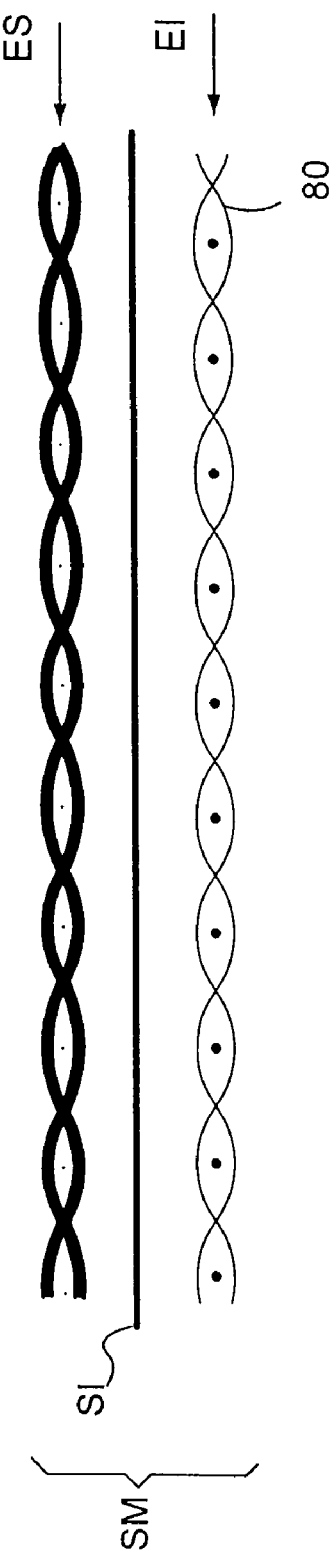

FIG. 3*a* is an enlarged schematic front view of the reed of the apparatus of FIG. 1;

FIG. 3*b* is a schematic section view of FIG. 3*a*;

FIG. 4 is an enlarged schematic front view of the orders of heddles of the apparatus of FIG. 1;

FIGS. 5 and 6 schematically show section views of two possible textile structures obtained with the method according to the present invention.

In the following description by the expression "textile structure resistant to perforation and penetration" it is meant to indicate a multilayer textile structure made at least partially with so-called "ballistic fibers", i.e. fibers with high resistance, tenacity and elastic modulus.

In particular, the present invention refers to a method and an apparatus for continuous production of a textile structure resistant to perforation and penetration of the multi-layer type and comprising at least two fabric elements overlapping one another, each of which is made, at least in part, with "ballistic fibers" having "semi-unidirectional" extension or with plain weave or with "unidirectional" extension.

In the following description, moreover, the adjectives "upper" and "lower" are used to indicate the relative arrangement between elements arranged at different heights with respect to a reference plane.

The method for continuous production of a textile structure resistant to perforation and penetration, according to the present invention, comprises the steps consisting in:
a) simultaneously weaving two fabric elements overlapped and spaced from each other, wherein at least the warp or chain threads of the upper fabric element and the weft threads of the lower fabric element, or vice-versa, comprise ballistic threads;
b) inserting, during the weaving step a), at least one intermediate layer between the upper fabric element and the lower fabric element;
c) joining the assembly of the two upper and lower fabric elements between which the intermediate layer is interposed to obtain a multilayer textile structure.

In the present description, for the sake of simplicity, it is presumed that at least the warp threads of the upper fabric element and the weft threads of the lower fabric element comprise ballistic threads, although, obviously, the opposite configuration can be provided. It should be specified that, as will become clearer with reference to the textile structure represented in FIG. 6, the warp threads of the upper fabric element and the weft threads of the lower fabric element, and vice-versa, can comprise, in addition to ballistic threads, also binding threads.

The method according to the finding also comprises a final step of collecting the multi-layer textile structure thus obtained.

The joining and collection steps can coincide with one another.

The insertion step b) consists in interposing between the two upper and lower fabric elements, during said weaving step, at least one intermediate layer in form of continuous or discontinuous tape or film.

The joining step c) occurs by hot or cold pressing the assembly comprising the upper fabric element and the lower fabric element between which the intermediate layer is interposed. The joining step c) is carried out in line with the weaving step of the two upper and lower fabric elements and the insertion between them of the intermediate layer.

After the joining step and before the collecting step, it is possible to provide at least one calendering step, also hot or cold, of the multilayer textile structure.

Again after the joining step and before the collecting step, it is possible to provide a step of applying, for example by impregnation or lamination, to at least one of the two opposite faces of the multilayer textile structure, at least one impregnating substance or at least one surface coating, respectively.

Preliminarily to the step of applying such an impregnating substance or surface coating, it is possible to carry out one or more washing steps of the multilayer textile structure and/or one or more corona and/or plasma treatment steps.

The steps indicated above, in particular those of washing, corona and/or plasma treatment, application of at least one surface coating layer and calendering are not described in detail since they can easily be recognized and worked out by the man skilled in the art.

As an alternative to carrying out the washing, corona and/or plasma treatment steps and subsequent impregnation of the multilayer textile structure, it is possible to use for the weaving of the two upper and lower fabric elements, threads that have already been pre-treated and impregnated in particular with water-repellent substances, including preferably fluoropolymers.

With regard to the weft threads of the upper fabric element, they can consist of ballistic threads and/or binding threads. Similarly, the warp or chain threads of the lower fabric element can consist of ballistic threads and/or binding threads. The ballistic and/or binding threads of the upper fabric element can be the same as or different from those of the lower fabric element. Equally, the ballistic threads or the binding threads, used in weft and/or warp, in the weaving of each of the two upper and lower fabric elements, can be different to one another.

Each of the two upper and lower fabric elements can thus have one of the following structures:
  warp or weft threads consisting of ballistic threads interwoven respectively by weft or warp threads consisting of binding threads, in which case the ballistic threads have an extension known as "semi-unidirectional" (FIG. 5);
  warp and weft threads consisting of ballistic threads woven with plain weave (not depicted);
  warp and weft threads consisting of ballistic threads not interwoven and arranged on two parallel and overlapped planes, such ballistic threads being interlaced by binding threads (FIG. 6); the ballistic threads of the two layers of each of the two fabric elements are arranged at 0°-90° with respect to one another, with a deviation of ±5°, the same deviation may be set between the relative orientation of the warp and weft threads of the upper fabric element with respect to those of the lower fabric element; in this case the ballistic threads of the two upper and lower fabric elements have an extension known as "unidirectional". With particular reference to such a structure, as represented in FIG. 6, it should be noted that the warp binding threads interweave with the weft ballistic threads and with the weft binding threads; whereas the weft binding threads also have a unidirectional extension and lie on a single plane.

By ballistic threads, as known to the man skilled in the art, it is meant to indicate threads made of ballistic fibers. In particular, the ballistic fibers are made of a polymeric material selected from the group comprising at least: poly-para-aramid, polycopoly-aramid, polybenzoxazole, polybenzothiazole, polyketone, polyethylene, polypropylene, polyesters with aromatic base, glass, carbon and basalt and the like. Indeed, other types of ballistic fibers are not ruled out.

In a preferred embodiment of the method object of the invention, the ballistic threads have the following characteristics:
  tensile strength>7 gr/dtex
  elastic modulus>200 gr/dtex
  impact strength>10 J/gr
  density>0.8 gr/cmc
  count comprised between 100 dtex and 10000 dtex.

On the other hand, concerning the binding threads, i.e. threads that, as known to the man skilled in the art, have no ballistic properties and that have a low tenacity and elastic modulus and the function of which is to temporarily hold the ballistic threads in position, they are made of thermoplastic polymeric material, thermosetting polymeric material, soluble material or their blends.

Preferably, the binding threads, if present in the upper fabric element and/or in the lower fabric element, are inserted with a frequency of between 1 thread/cm and 30 threads/cm.

With regard to the intermediate layer, be it in form of continuous tape or film or in discontinuous form, it is made of thermoplastic polymeric material, thermosetting polymeric material, elastomeric material, viscous material, adhesive polymers or their blends.

Preferably, the intermediate layer is made of a polymer selected from the group comprising at least: polyurethane, polyethylene, polypropylene, polyester, styrene-butadiene, polycarbonate, phenol or polyvinyl butyral, polyisobutene, polyisobutylene, silicon polymers, natural or synthetic rubber. However, this does not rule out other polymers or substances with which to make the intermediate layer.

The intermediate layer can also comprise additives such as, purely as an example, metallic, ceramic, carbon or similar particles. Moreover, it can have a continuous structure, a mesh structure or with microholes or holes or in any case discontinuous.

The intermediate layer itself can also consist of a tenacious material with ballistic properties, including for example: felt, non-woven fabric, weft and warp fabric, ballistic textile structure with unidirectional fibers, ballistic textile structure with semi-unidirectional fibers, ballistic plain-weave textile structure or others.

Finally, the intermediate layer can itself have a multi-layer structure and be impregnated or coated with polymers, adhesives, adhesive polymers or viscous or viscoelastic fluids; the latter are at least partially given up to the two upper and lower fabric elements.

Finally, with regard to the impregnating substance or the surface coating possibly applied to one of the two faces of the multilayer textile structure, it is made, purely as an example, of thermoplastic, thermosetting or elastomeric polymers, of viscous or viscoelastic materials, of silicon polymers or their blends.

FIG. 1 shows the scheme of an apparatus 1 for implementing the method for continuous production of a multilayer textile structure resistant to perforation and penetration according to the present invention.

The apparatus 1, in its basic structure, comprises a weaving loom 2 with two overlapped fabric elements for the simultaneous weaving of the upper fabric element ES and of the lower fabric element EI overlapped and spaced from one another, with a structure as described above.

The apparatus 1 also comprises a feeding group 3 of the intermediate layer SI arranged upstream of the weaving loom 2 to feed the intermediate layer SI between the upper fabric element ES and the lower fabric element EI during the weaving step thereof.

The apparatus 1 also comprises a group 4 for drawing and joining the assembly consisting of the upper fabric element ES, the lower fabric element EI and the intermediate layer SI interposed between them, so as to form a multilayer textile structure SM. The drawing and joining group 4 is arranged downstream of the weaving loom 2.

Downstream of the drawing and joining group 4 a group 5 for collecting the multilayer textile structure SM thus formed is arranged.

The weaving loom 2 comprises a support framework 6 with which are associated an upper feeding group that consists of at least one beam 7 from which the warp threads 70 unwind for the weaving of the upper fabric element ES and a lower feeding group that consists of at least one beam 8 from which the warp threads 80 unwind for the weaving of the lower fabric element EI.

Near to the upper beam 7 and the lower beam 8 the feeding group 3 of the intermediate layer SI is arranged that, in the depicted case, consists of a roll 30 that feeds an intermediate layer SI in form of continuous tape or film.

Downstream of the upper beam 7 and lower beam 8 there is an order of heddles 9, within the eyelets of which the warp threads 70 of the upper fabric element ES are made to pass, and an order of heddles 10, within the eyelets of which the warp threads 80 of the lower fabric element EI are made to pass.

Downstream of the heddles 9 and 10 there is a sley 11 that bears a reed 12 between whose teeth pass the warp threads 70 of the upper fabric element ES and the warp threads 80 of the lower fabric element EI.

Downstream of the sley 11 there are at least two simultaneous insertion members of the weft threads respectively in the upper and lower warp mouths defined by the motion of the two orders of heddles 9 and 10 for the formation, respectively, of the upper fabric element ES and of the lower fabric element EI. Such insertion members can consist of respective pincers 13 and 14 or lances, or shuttles or air jet devices.

The intermediate layer SI moves forwards along a plane defined by resting and sliding members, which comprise for example a series of rollers 15.

There are also beams 16, sorting rods 17 and thread-drop members 18 of the warp threads 70 and 80.

The special characteristic of the apparatus 1 object of the invention is the structure of the reed 12 and of the orders of heddles 9 and 10. Indeed, in order to allow the insertion between the upper fabric element ES and the lower fabric element EI, during the weaving thereof, of the intermediate layer SI, in form of continuous tape or film, they are interrupted at the plane of forward movement of the intermediate layer SI itself.

In greater detail, the reed 12 comprises a framework consisting of an upper cross member 120 and a lower cross member 121 joined by uprights 122. Between the upper cross member 120 and the lower cross member 121 extend two series of teeth 123 one on top of the other so as to define a window 124 for the intermediate layer SI to pass. At the window 124, the two upper and lower series of teeth 123 are fixedly connected to respective transverse bars 125.

With reference to the orders of heddles 9 and 10, represented in FIG. 4, the links of the heddles 9 and of the heddles 10 are interrupted at the plane of forward movement of the intermediate layer SI. In practice, the links of the heddles 9 extend above the plane of forward movement of the intermediate layer SI, whereas the links of the heddles 10 extend beneath the plane of forward movement of the intermediate layer SI.

It should be specified that in the attached figures and in the present description the driving members, the movement mechanisms, the guide, control and selection members that, as known to the man skilled in the art, fit out and complete the structure of the weaving loom 2, are not represented and described in detail.

The drawing and joining group 4 comprises at least one pair of pressure rollers parallel and counter-rotating with respect to each other, so-called take up beams 40 and 41, which can be heated.

The collecting group 5 comprises a beam 50 for collecting the multilayer textile structure SM formed.

Figure 2:
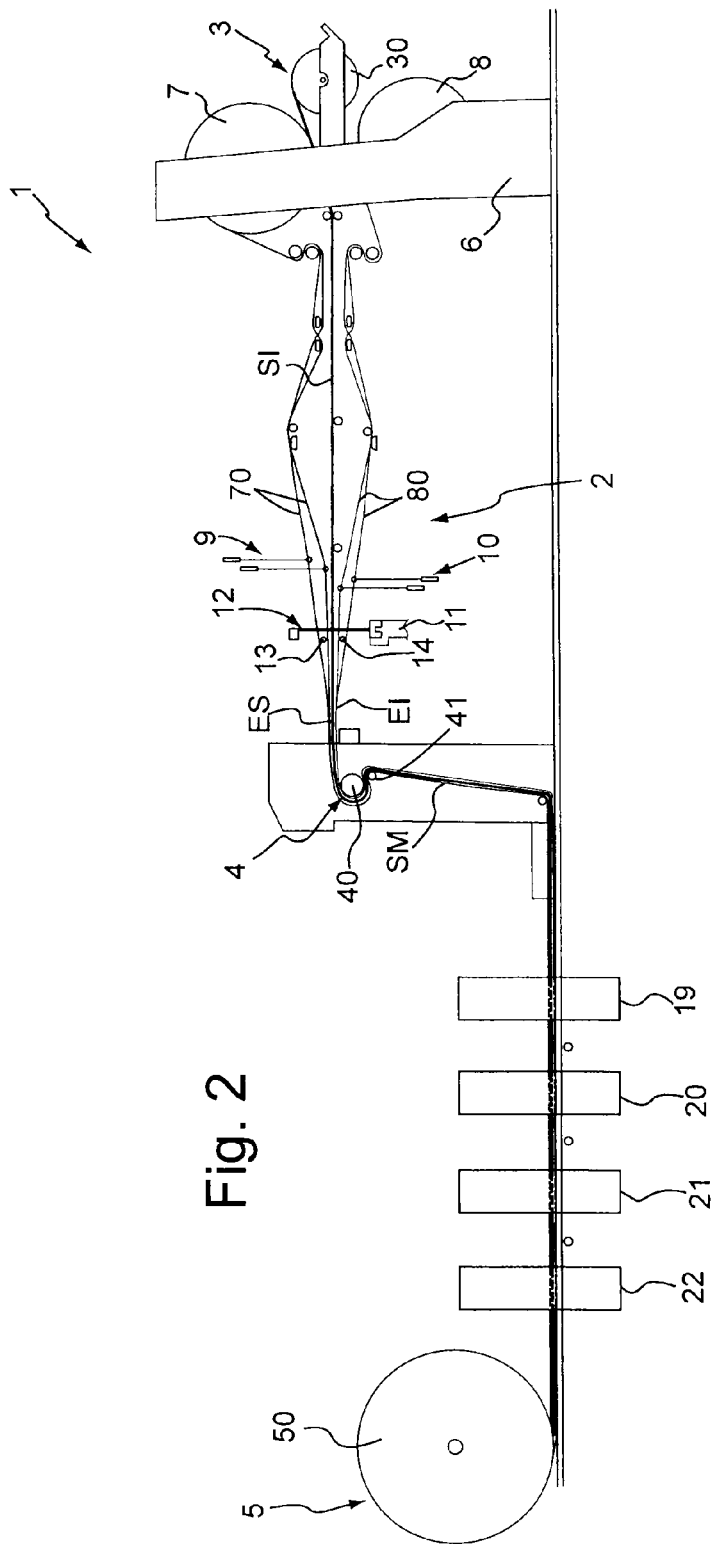
FIG. 2 is a side elevational schematic view of an alternative embodiment of the apparatus of FIG. 1.

FIG. 2 represents the scheme of an alternative embodiment of the apparatus 1 that differs from the embodiment represented in FIG. 1 in that it comprises, between the drawing and joining group 4 and the collecting group 5: at least one hot or cold calendering station 19, a washing group 20 of the multilayer textile structure SM, a corona or plasma treatment group 21 of the multilayer textile structure SM and an application group 22, by impregnation or by lamination, of at least one impregnation substance or of a surface coating on at least one of the two faces of the multilayer textile structure SM. It is also intended that it is possible to provide even just a few of the groups indicated above, for example just the calendering group 19, or many series thereof also in a different succession. The same groups are not necessary in the case in which threads already pre-treated and impregnated with a water-repellent substance, preferably based on fluoropolymers, are used for the weaving of the two upper and lower fabric elements.

The groups for calendering, washing, corona and plasma treatment, impregnation or application of the layer of surface coating are not described in detail since they are known to the man skilled in the art.

The operation of the apparatus 1 can immediately be understood by the man skilled in the art, in particular the drawing and joining group 4 moves forward the assembly consisting of the upper fabric element ES and the lower fabric element EI interposed between which is the intermediate layer SI, unwinding the warp threads 70, the warp threads 80 and the intermediate layer SI from the relative feeding beams 7 and 8 and roll 30.

The pincers 13 and 14 simultaneously insert the weft threads, not depicted, into the warp mouths formed by the movement of the heddles 9 and 10 forming the two upper ES and lower EI fabric elements. The reed 12, fixedly connected to the sley 11, which is actuated with alternate oscillating motion, compacts and pushes the weft towards the drawing and joining group 4.

During the weaving of the two upper ES and lower EI fabric elements, the intermediate layer SI, pulled by the drawing and joining group 4, moves forward between the warp threads 70 and 80 and passes through the window 124 of the reed 12 and the window left free by the links of the heddles 9 and 10, thus inserting between the two fabric elements during their own formation.

The multilayer textile structure SM thus obtained can be subjected to further finishing treatments and can be used in flexible form, for example to manufacture personal bullet-proof armor. On the other hand, if it is suitably treated, for example by impregnation with a matrix having a rigid base or by coupling with external coating layers, it can take on characteristics of rigidity. In this case, by overlapping and joining many layers, it can be used to make helmets, armor or any other rigid item that must offer resistance to perforation and penetration of bullets, fragments, arms, pointed or sharp objects and the like.

The method according to the finding allows multi-layer textile structures to be obtained with a variable weight of between 80 gr/m$^2$ and 1000 gr/m$^2$.

Thanks to the simultaneous weaving of two fabric elements overlapped and spaced from each other, wherein at least the warp threads of one and the weft threads of the other, or vice-versa, consist, at least in part, of ballistic threads, upon insertion between them, during their weaving, of an intermediate layer and upon their joining, carried out in line with the weaving, the method and the apparatus according to the present invention allow a multilayer textile structure to be obtained in a single stage. This allows the production time and cost to be reduced and, therefore, allows productivity to be increased with respect to known processes.

The method and apparatus according to the present invention allow multi-layer textile structures resistant to perforation and penetration to be obtained in which the ballistic threads are aligned in the desired direction and do not undergo damage or relative movements, with consequent improvement of the ballistic properties. The ballistic threads of the two woven elements, indeed, are bound during weaving and stabilized by the joining of the two fabric elements with the intermediate layer carried out just downstream of the weaving itself.

The method and apparatus according to the present invention allow multi-layer textile structures resistant to perforation and penetration of any width to be obtained, with it indeed being sufficient to modify the number of warp threads.

The method for producing the textile structure resistant to perforation and penetration and the apparatus for implementing it thus conceived can undergo numerous modifications and variants, all of which are covered by the invention; moreover, all of the details can be replaced by technical equivalent elements. In practice, the materials used, as well as the sizes, can be whatever according to the technical requirements.

The invention claimed is:

1. A method for continuous production of a textile structure resistant to perforation and penetration, comprising:
   a) simultaneously weaving an upper fabric element ES and a lower fabric element EI, overlapped and spaced from each other, wherein each of the fabric elements ES and EI comprises warp threads and weft threads, wherein at least the warp threads of the upper fabric element ES and the weft threads of the lower fabric element EI, or vice-versa, comprise ballistic threads;
   b) inserting, during said weaving, at least one intermediate layer SI between said upper fabric element ES and said lower fabric element EI;
   c) joining the assembly of the upper fabric element ES and the lower fabric element EI between which said intermediate layer SI is interposed to obtain a multilayer textile structure SM.

2. The method according to claim 1, wherein said at least one intermediate layer SI is in a form of a continuous or discontinuous tape or film.

3. The method according to claim 1, wherein said joining occurs by hot or cold pressing said assembly of the upper fabric element ES and lower fabric element EI between which said intermediate layer SI is interposed.

4. The method according to one of claims 1 to 3, comprising, after said joining, applying to said multilayer textile structure SM at least one impregnating substance or at least one surface coating.

5. The method according to claim 1, wherein the warp and weft threads of said upper fabric element ES and/or the warp and weft threads of said lower fabric element EI, comprise ballistic threads.

6. The method according to claim 1, wherein said ballistic threads have the following characteristics:
   tensile strength>7 gr/dtex
   elastic modulus>200 gr/dtex
   impact strength>10 J/gr
   density>0.8 gr/cmc
   count comprised between 100 dtex and 10000 dtex.

7. The method according to claim 1, wherein the weft threads of said upper fabric element ES and/or the warp or chain threads of said lower fabric element EI, or vice-versa, comprise binding threads.

8. The method according to claim 7, wherein said binding threads are present in said upper and lower fabric elements with frequency comprised between 1 thread/cm and 30 threads/cm.

9. The method according to claim 2, wherein said intermediate layer SI is made of a member selected from the group consisting of thermoplastic polymeric material, thermosetting polymeric material, elastomeric material, viscous material, adhesive polymers and their blends.

10. The method of claim 2, wherein said at least one intermediate layer SI in the form of a continuous or discontinuous tape or film is formed from a material selected from the group consisting of felt, non-woven fabric, weft and warp fabric, ballistic textile structure with unidirectional fibers, ballistic textile structure with semi-unidirectional fibers, and ballistic weft and warp textile structure.

* * * * *